United States Patent [19]
Nishimura

[11] Patent Number: 5,757,556
[45] Date of Patent: May 26, 1998

[54] ZOOM LENS

[75] Inventor: Takeshi Nishimura, Kanagawa-ken, Japan

[73] Assignee: Canon Kabushiki Kaisha, Tokyo, Japan

[21] Appl. No.: 634,841

[22] Filed: Apr. 19, 1996

[30] Foreign Application Priority Data

May 10, 1995 [JP] Japan ................ 7-136098

[51] Int. Cl.$^6$ ................ G02B 15/14; G02B 3/02
[52] U.S. Cl. ................ 359/692; 359/713
[58] Field of Search ................ 359/692, 690, 359/713, 795, 688, 687

[56] References Cited

U.S. PATENT DOCUMENTS

| | | | |
|---|---|---|---|
| 4,659,186 | 4/1987 | Sato et al. | 350/426 |
| 4,818,081 | 4/1989 | Ito | 350/423 |
| 5,175,650 | 12/1992 | Takayama et al. | 359/716 |
| 5,229,887 | 7/1993 | Hayashi et al. | 359/692 |
| 5,309,285 | 5/1994 | Ito | 359/692 |
| 5,381,270 | 1/1995 | Cho | 359/692 |
| 5,434,712 | 7/1995 | Ito | 359/692 |
| 5,585,971 | 12/1996 | Itoh | 359/692 |

FOREIGN PATENT DOCUMENTS

| | | |
|---|---|---|
| 56-128911 | 10/1981 | Japan. |
| 57-201213 | 12/1982 | Japan. |
| 60-170816 | 9/1985 | Japan. |
| 60-191216 | 9/1985 | Japan. |
| 62-56917 | 3/1987 | Japan. |
| 62-90611 | 4/1987 | Japan. |
| 64-57222 | 3/1989 | Japan. |
| 3-20734 | 3/1991 | Japan. |
| 3-116110 | 5/1991 | Japan. |
| 3-179310 | 8/1991 | Japan. |
| 4-247 | 1/1992 | Japan. |
| 4-362908 | 12/1992 | Japan. |
| 5-323187 | 12/1993 | Japan. |

*Primary Examiner*—Scott J. Sugarman
*Assistant Examiner*—Jordan M. Schwartz
*Attorney, Agent, or Firm*—Fitzpatrick, Cella, Harper & Scinto

[57] ABSTRACT

A zoom lens of compact form comprises, in order from an object side to an image side, a first lens unit of positive refractive power and a second lens unit of negative refractive power. The first lens unit includes a positive first lens of meniscus form convex toward the object side, a negative second lens, a negative third lens and a positive fourth lens. The second lens unit includes a positive fifth lens and a negative sixth lens. Zooming is effected by varying a separation between the first lens unit and the second lens unit, and the following conditions are satisfied:

$$0.5 < f1/fw < 0.9$$

$$0.01 < D6/fw < 0.1$$

where f1 is a focal length of the first lens unit, fw is a focal length in a wide-angle end of the zoom lens, and D6 is an axial air separation between the third lens and the fourth lens.

12 Claims, 11 Drawing Sheets

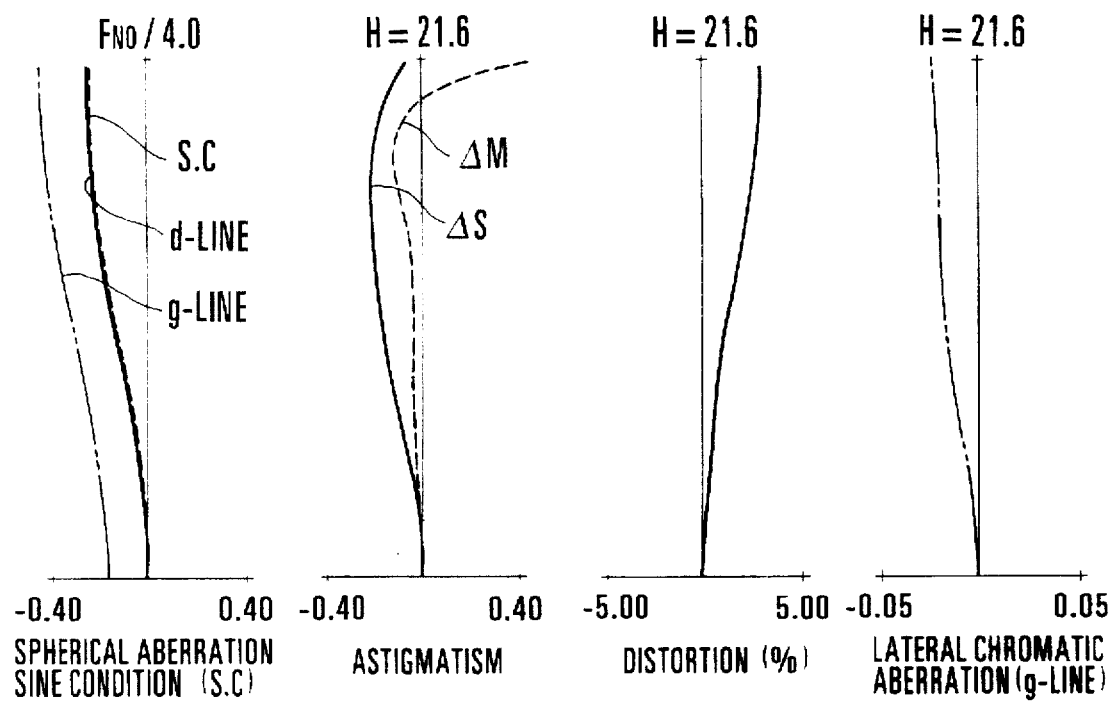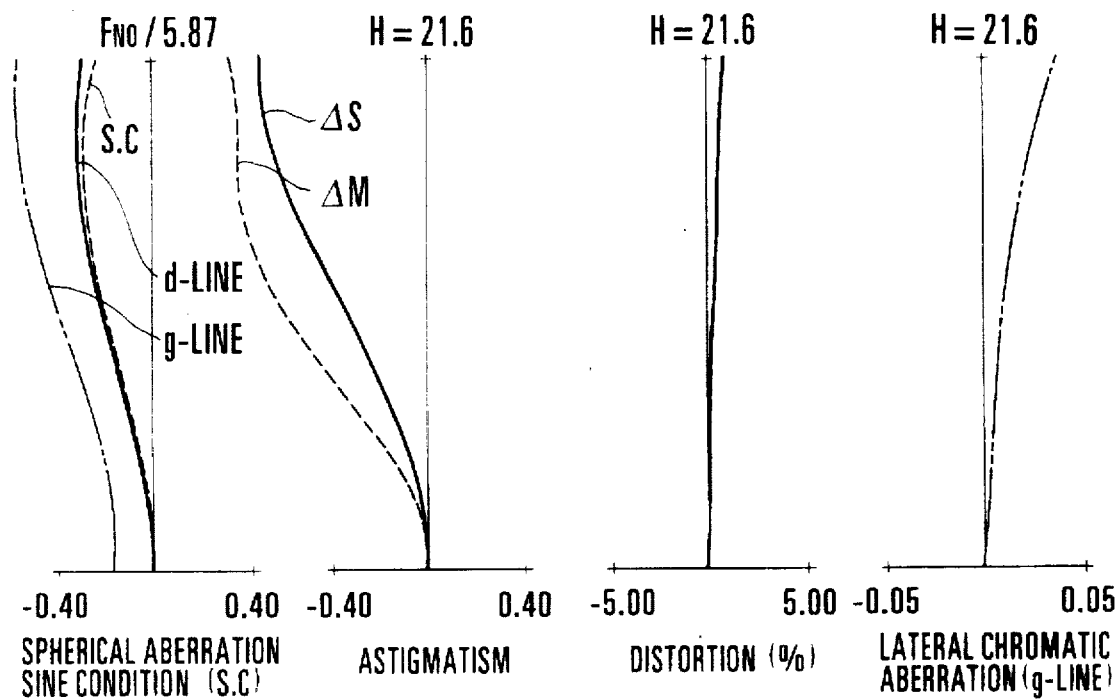

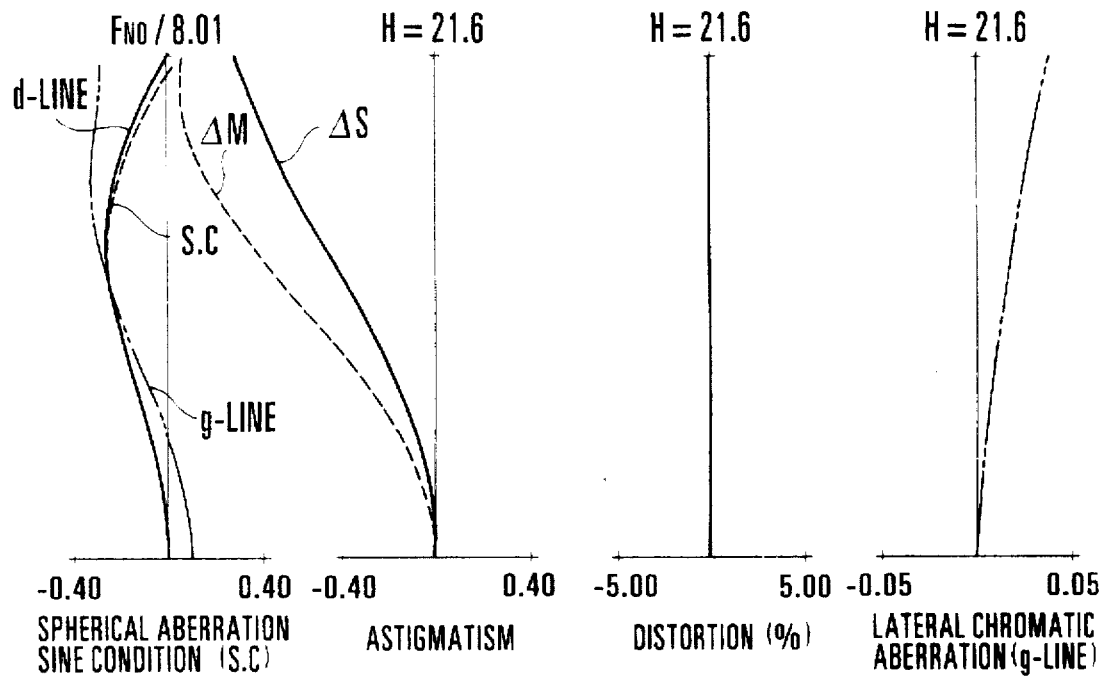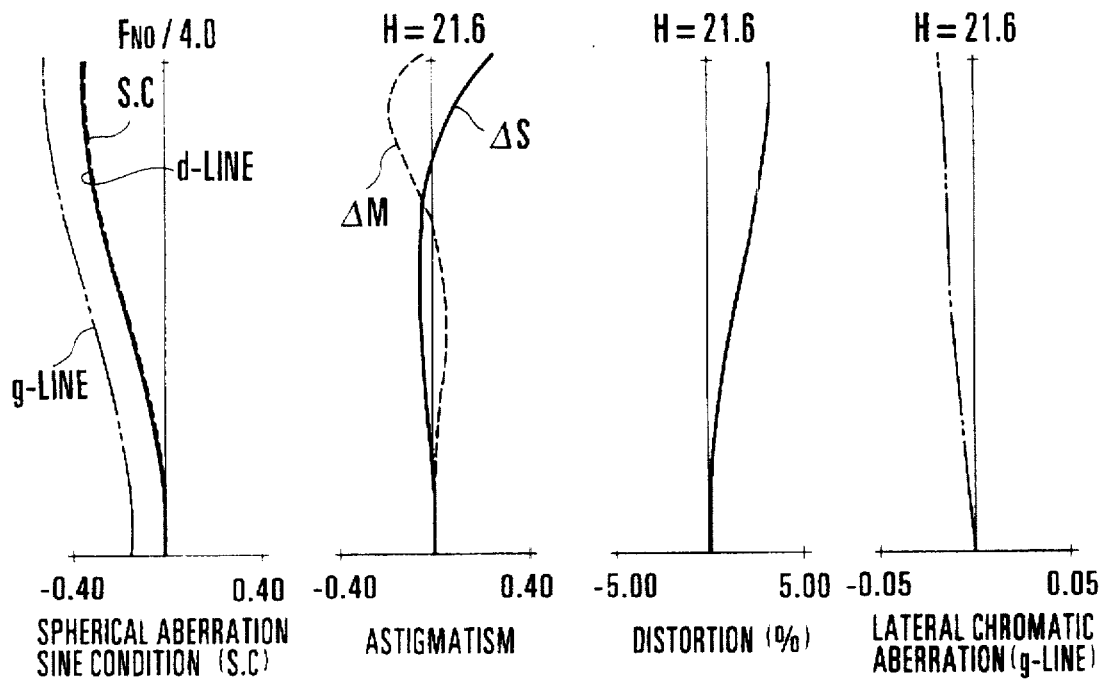

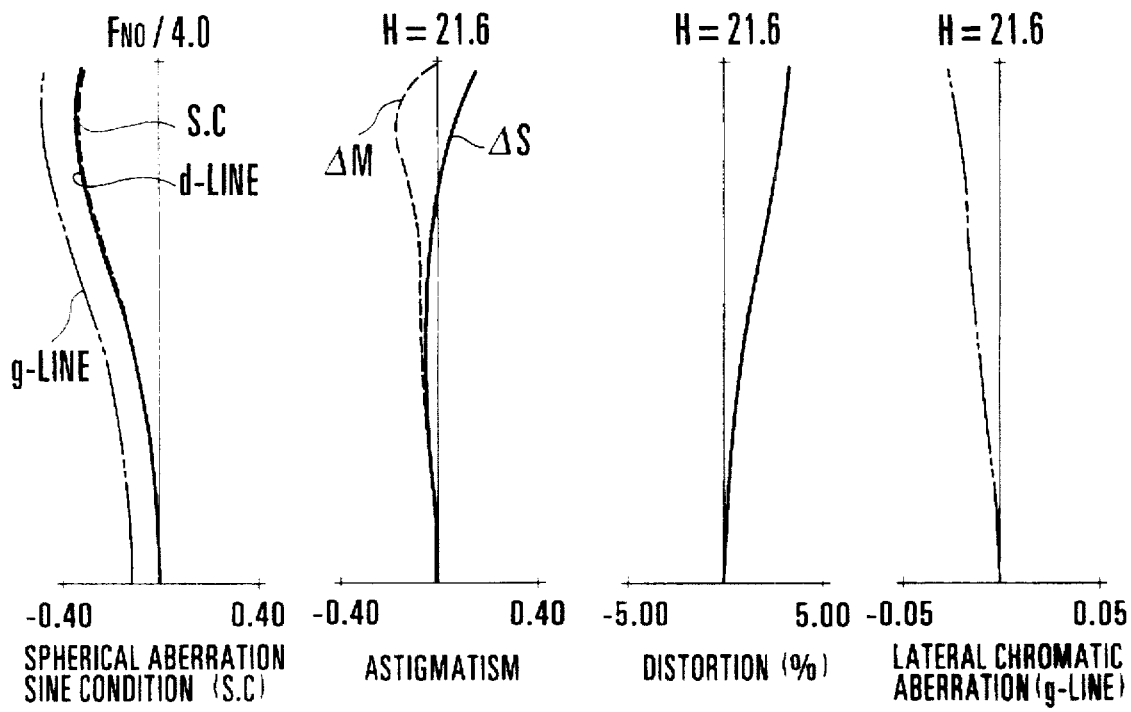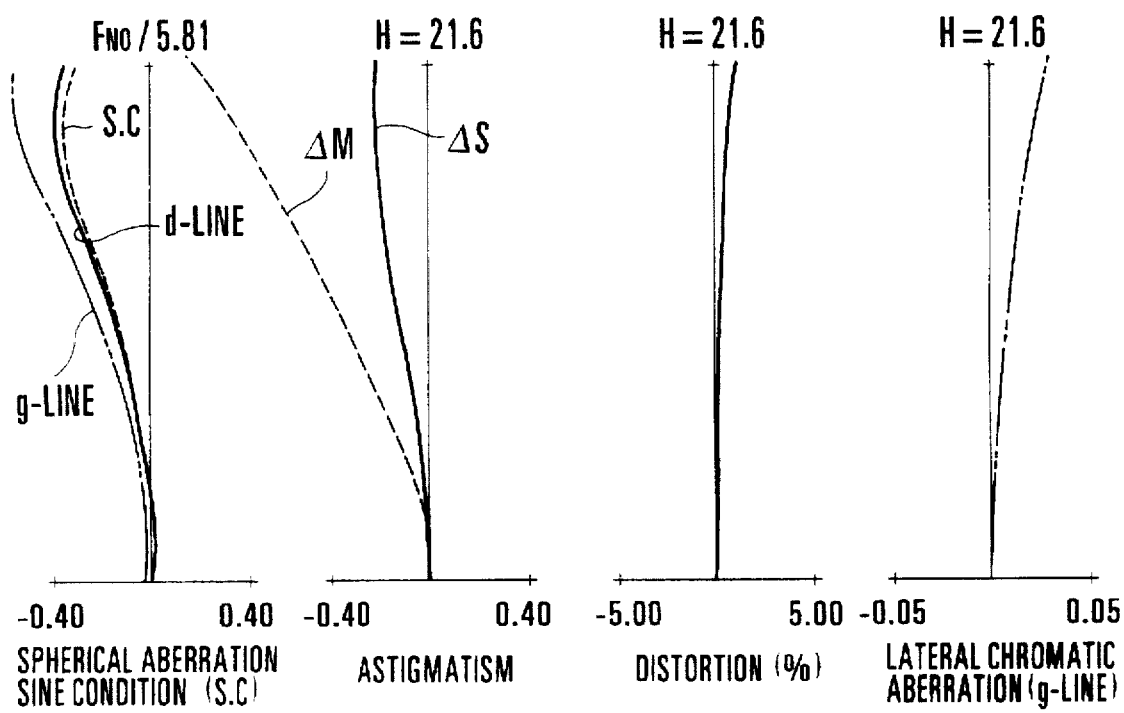

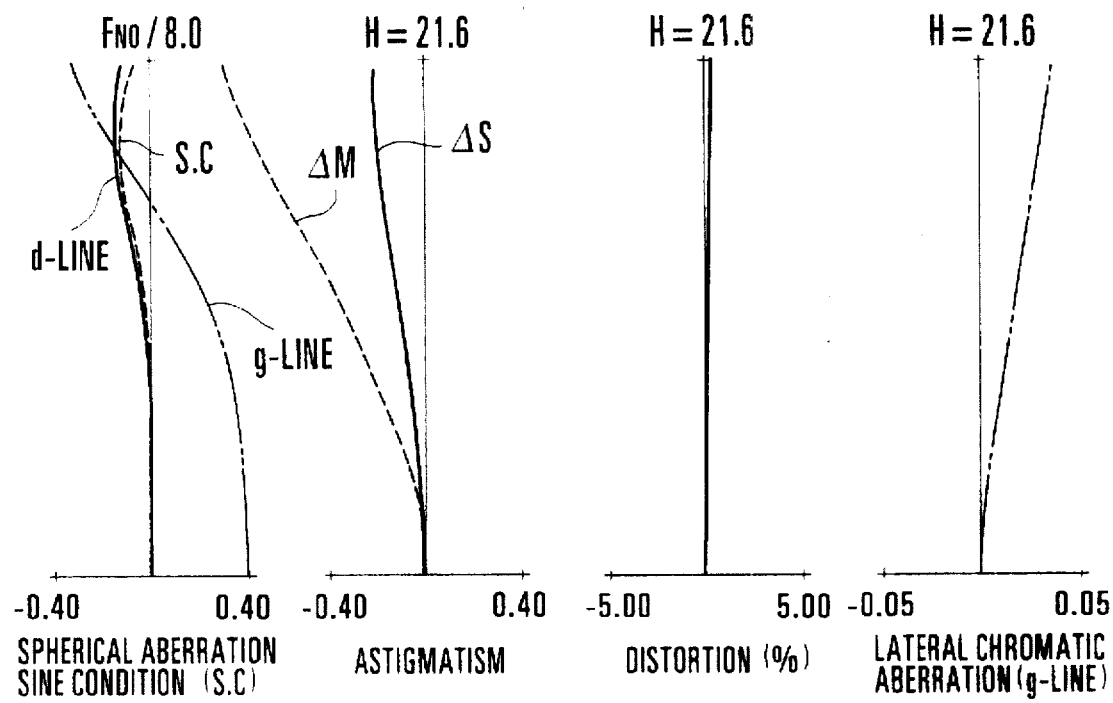
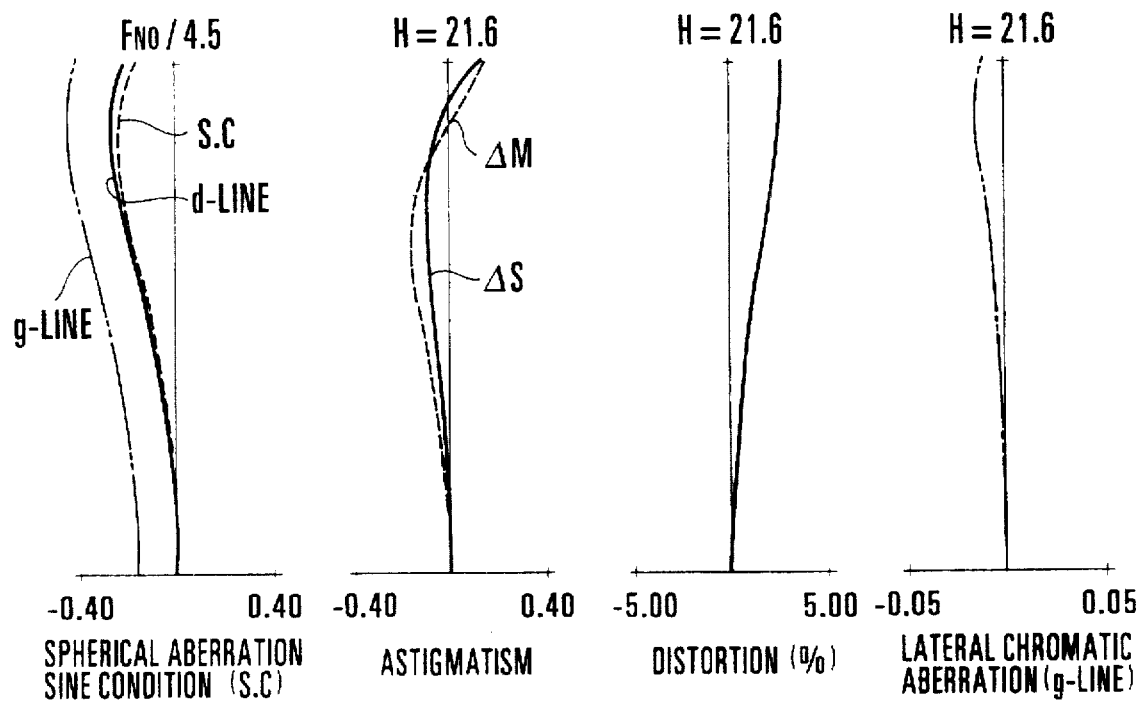

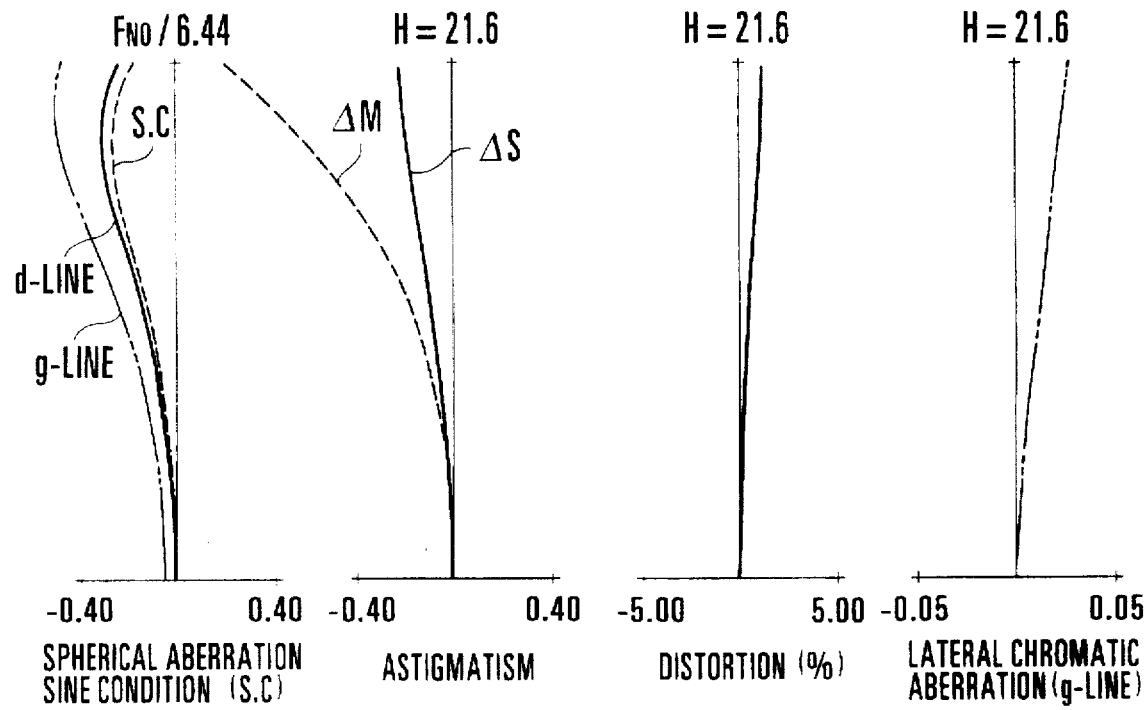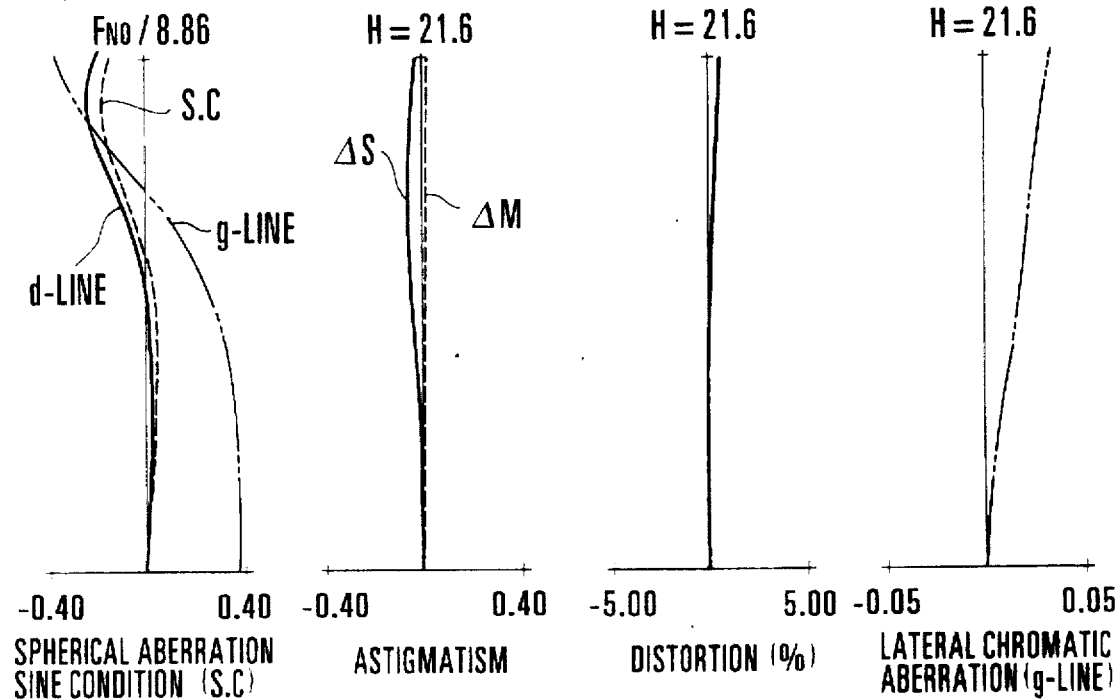

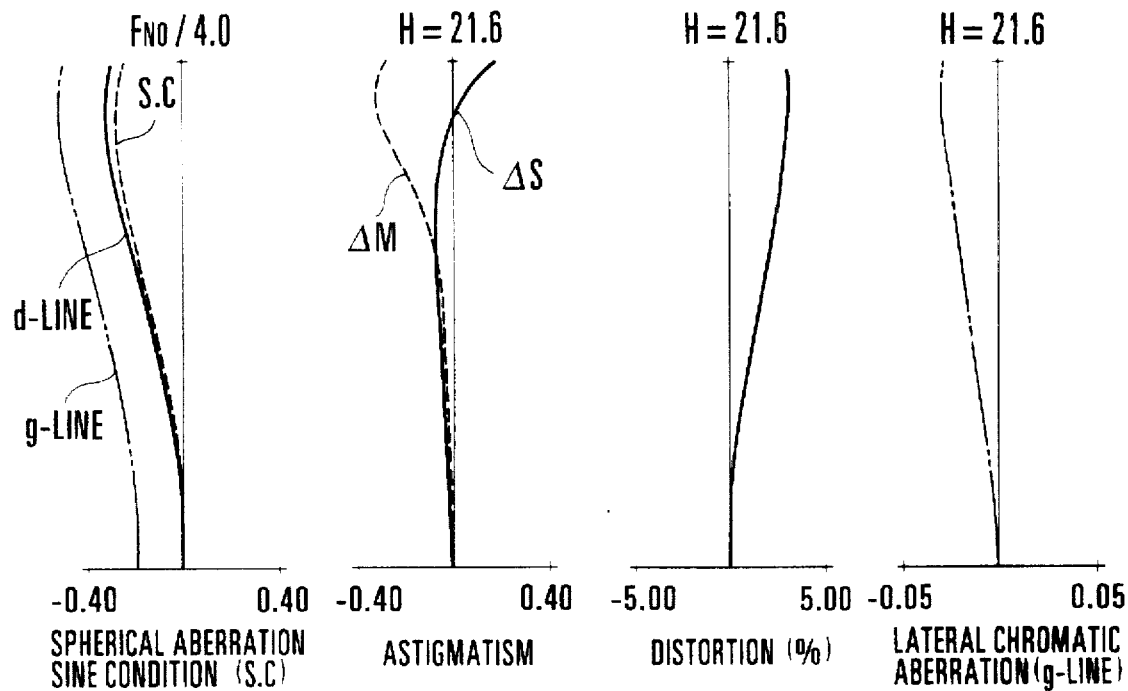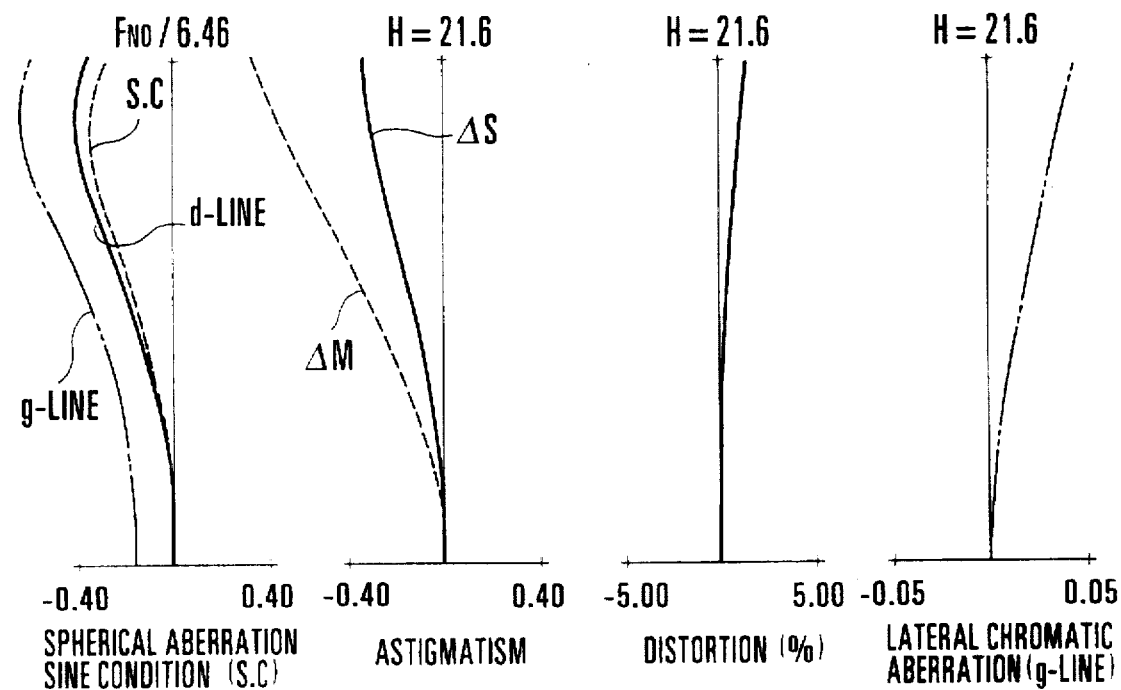

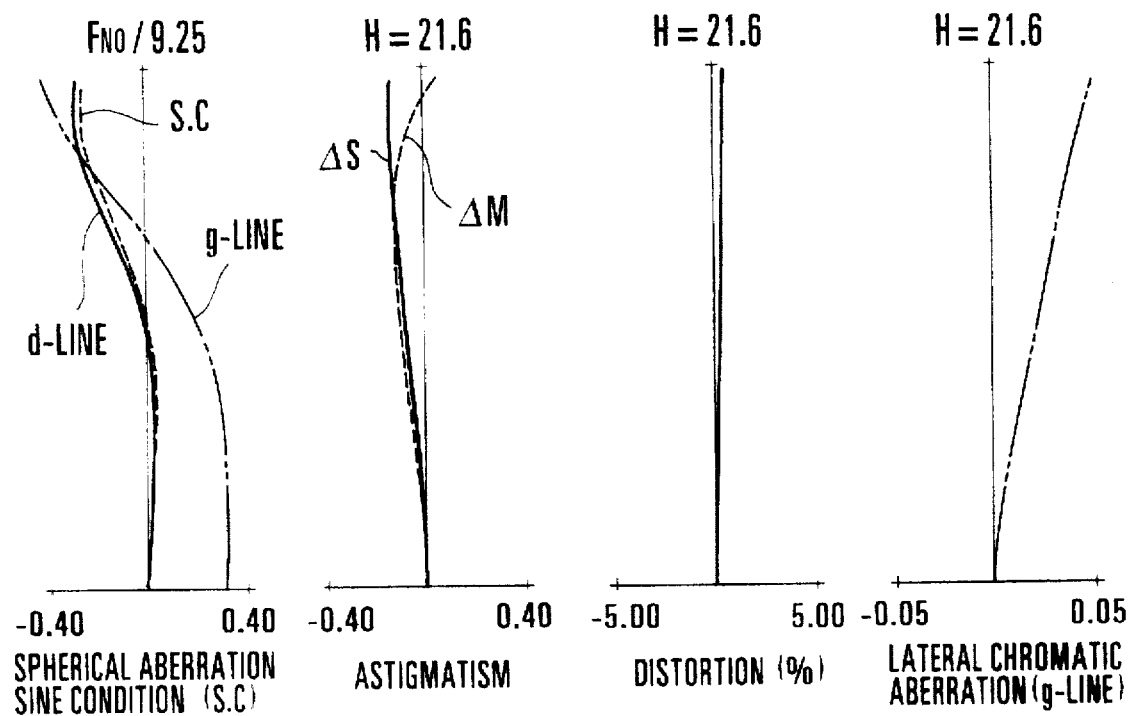

ZOOM LENS

BACKGROUND OF THE INVENTION

1. Field of the Invention

This invention relates to a zoom lens comprising two lens units suited to lens-shutter cameras, or video cameras and, more particularly, relates to a small-sized, wide-angle zoom lens whose variable magnification ratio is about 2 with the total length (the distance from the front vertex to the image plane) shortened.

2. Description of the Related Art

For the lens-shutter camera or video camera, there has been an increasing tendency to improve the compact form. Along with this, in recent years, the demand for compact zoom lenses of even more shortened total length has come.

Japanese Laid-Open Patent Applications Nos. Sho 56-128911, Sho 57-201213, Sho 60-170816, Sho 60-191216, Sho 62-56917, Sho 62-90611, Sho 64-57222 and Hei 3-116110, etc., propose a zoom lens comprising, in order from an object side, a first lens unit of positive refractive power and a second lens unit of negative refractive power, totaling two lens units, the separation therebetween being varied to vary the focal length, or so-called 2-unit zoom lens in compact form.

In these publications, with the use of the plus-minus refractive power arrangement in this order from the object side, the back focal distance is made comparatively short, while still keeping high optical performance. The 2-unit zoom lens of shortened total length has thus been achieved.

Of those publications, Japanese Laid-Open Patent Application No. Sho 56-128911, for example, proposes a compact zoom lens of which the first lens unit is constructed with four lenses in a plus-minus-plus-plus refractive power arrangement and the second lens unit is constructed with two lenses in a plus-minus refractive power arrangement.

Further, in the above-cited Japanese Laid-Open Patent Applications Nos. Sho 64-57222 and Hei 3-116110, the first lens unit is constructed also with four lenses but in a plus-minus-plus-minus refractive power arrangement and the second lens unit is constructed with two lenses in a plus-minus refractive power arrangement. In addition, in Japanese Laid-Open Patent Application No. Sho 62-90611, the first lens unit is constructed also with four lenses but in a plus-minus-minus-plus refractive power arrangement and the second lens unit is constructed with two lenses in a plus-minus refractive power arrangement.

With the use of the 2-unit type zoom lens which has the first lens unit of positive refractive power and the second lens unit of negative refractive power, in order to obtain a good optical performance throughout the entire variable magnification range, while still maintaining a variable magnification ratio of about 2 and improvements of the compact form of the entire lens system to be achieved, there is need to set forth appropriate rules of design for the constituent lenses of each lens unit.

In general, the stronger the refractive powers of both of the first and second lens units, the shorter the total zooming movements of these lens units become. So, a much-desired shortening of the total length becomes possible to do. However, the mere increase of the refractive power of every lens unit will result in getting larger variation of aberrations with zooming, which are difficult to correct well, thus producing a problem.

SUMMARY OF THE INVENTION

An object of the invention is to provide a zoom lens having a high optical performance. Specifically, another object of the invention is to provide a zoom lens whose field angle is wide and which has a variable magnification ratio of about 2 and is compact.

To attain these objects, in accordance with a first aspect of the invention, a zoom lens comprises, in order from an object side to an image side, a first lens unit having a positive refractive power, including a first lens of meniscus shape convex toward the object side having a positive refractive power, a second lens having a negative refractive power, a third lens having a negative refractive power and a fourth lens having a positive refractive power, and a second lens unit having a negative refractive power, including a fifth lens having a positive refractive power and a sixth lens having a negative refractive power, wherein zooming is effected by varying a separation between the first lens unit and the second lens unit, and wherein, letting a focal length of the first lens unit be denoted by f1, a focal length in a wide-angle end of the zoom lens be denoted by fw, and an axial air separation between the third lens and the fourth lens be denoted by D6, the following conditions are satisfied:

$$0.5 < f1/fw < 0.9$$

$$0.01 < D6/fw < 0.1.$$

Further, to attain these objects, in accordance with a second aspect of the invention, a zoom lens comprises, in order from an object side to an image side, a first lens unit having a positive refractive power, including a first lens of meniscus form convex toward the object side having a positive refractive power, a second lens having a negative refractive power, a third lens of meniscus form convex toward the object side having a negative refractive power and a fourth lens having convex surfaces both on the object side and the image side and having a positive refractive power, and a second lens unit having a negative refractive power, including a fifth lens having a positive refractive power and a sixth lens having a negative refractive power, wherein zooming is effected by varying a separation between the first lens unit and the second lens unit, and wherein, letting a focal length of the first lens unit be denoted by f1, a focal length in a wide-angle end of the zoom lens be denoted by fw, a radius of curvature of a surface on the image side of the third lens be denoted by R6, and a radius of curvature of a surface on the object side of the fourth lens be denoted by R7, the following conditions are satisfied:

$$0.5 < f1/fw < 0.9$$

$$0.5 < R6/R7 < 0.9.$$

BRIEF DESCRIPTION OF THE DRAWINGS

FIGS. 6A to 6D are graphic representations of the aberrations of the numerical example 1 of the invention in the wide-angle end.

FIGS. 7A to 7D are graphic representations of the aberrations of the numerical example 1 of the invention in a middle position.

FIGS. 8A to 8D are graphic representations of the aberrations of the numerical example 1 of the invention in the telephoto end.

FIGS. 9A to 9D are graphic representations of the aberrations of the numerical example 2 of the invention in the wide-angle end.

FIGS. 12A to 12D are graphic representations of the aberrations of the numerical example 3 of the invention in the wide-angle end.

FIGS. 13A to 13D are graphic representations of the aberrations of the numerical example 3 of the invention in a middle position.

FIGS. 14A to 14D are graphic representations of the aberrations of the numerical example 3 of the invention in the telephoto end.

FIGS. 15A to 15D are graphic representations of the aberrations of the numerical example 4 of the invention in the wide-angle end.

FIGS. 16A to 16D are graphic representations of the aberrations of the numerical example 4 of the invention in a middle position.

FIGS. 17A to 17D are graphic representations of the aberrations of the numerical example 4 of the invention in the telephoto end.

FIGS. 18A to 18D are graphic representations of the aberrations of the numerical example 5 of the invention in the wide-angle end.

FIGS. 19A to 19D are graphic representations of the aberrations of the numerical example 5 of the invention in a middle position.

FIGS. 20A to 20D are graphic representations of the aberrations of the numerical example 5 of the invention in the telephoto end.

THE DETAILED DESCRIPTION OF THE PREFERRED EMBODIMENTS

Figure 1:
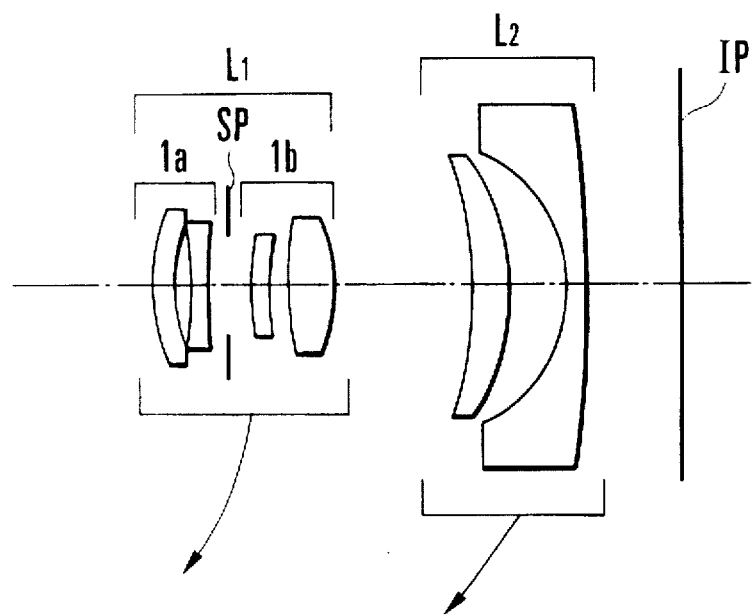
FIG. 1 is a lens block diagram of a numerical example 1 of the invention.
Figure 2:
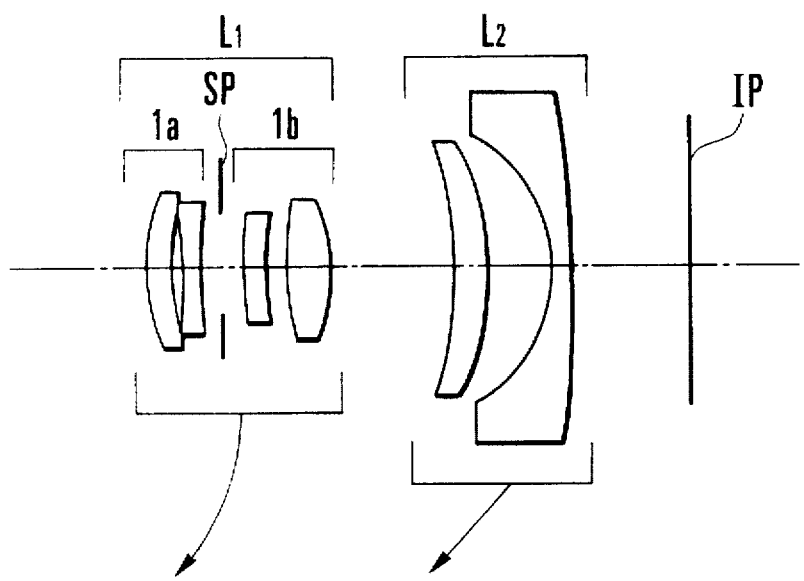
FIG. 2 is a lens block diagram of a numerical example 2 of the invention.
Figure 3:
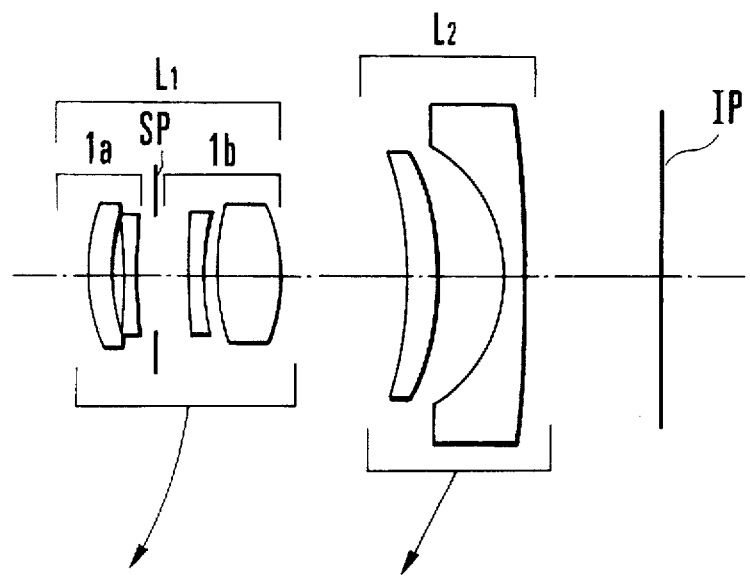
FIG. 3 is a lens block diagram of a numerical example 3 of the invention.
Figure 4:
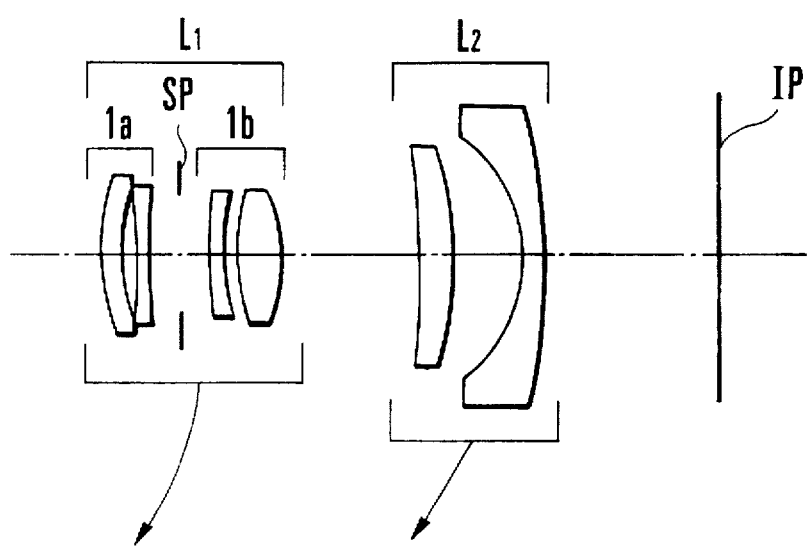
FIG. 4 is a lens block diagram of a numerical example 4 of the invention.
Figure 5:
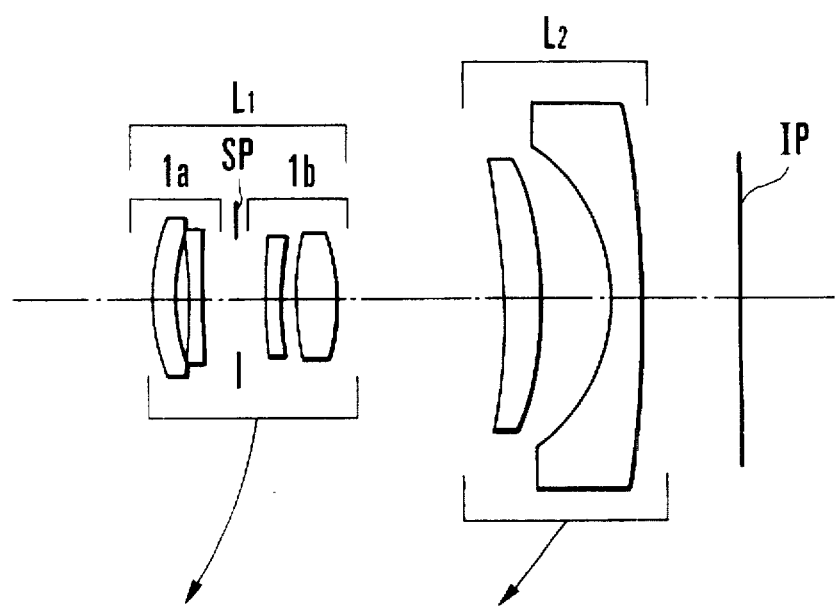
FIG. 5 is a lens block diagram of a numerical example 5 of the invention.
Figures 10A, 10B, 10C, 10D:
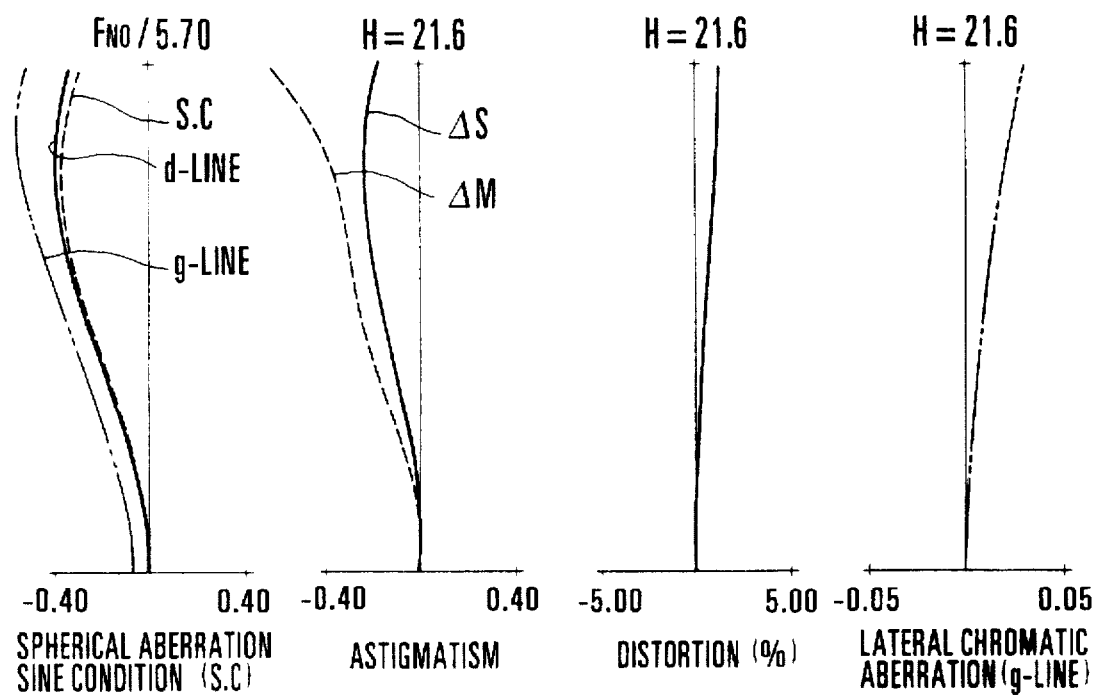
FIGS. 10A to 10D are graphic representations of the aberrations of the numerical example 2 of the invention in a middle position.
Figures 11A, 11B, 11C, 11D:
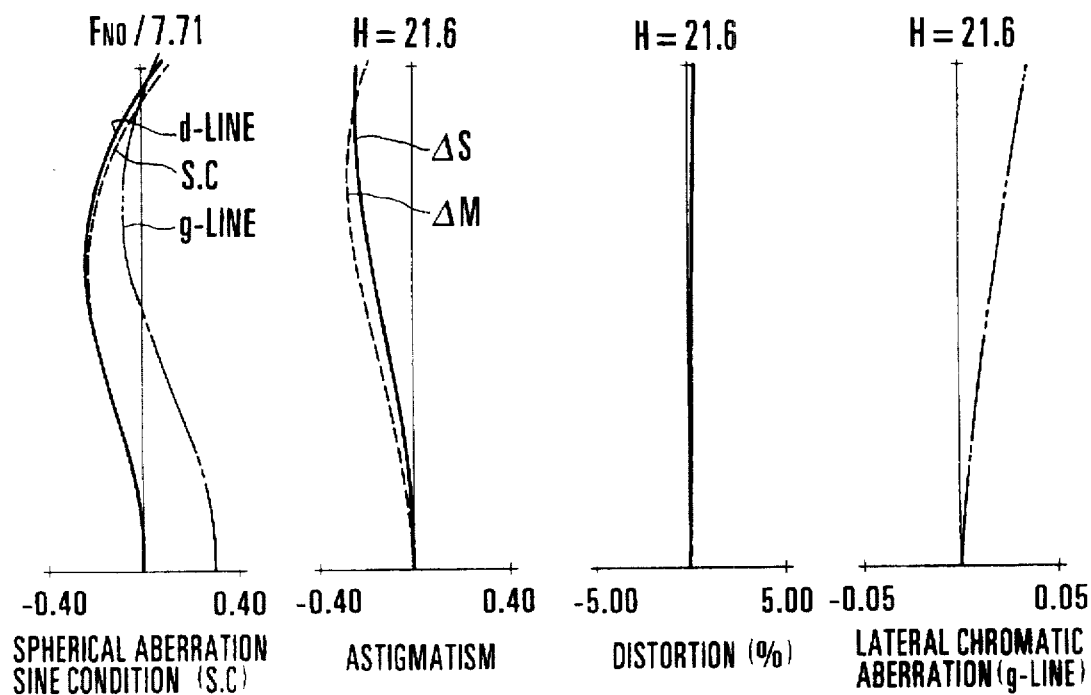
FIGS. 11A to 11D are graphic representations of the aberrations of the numerical example 2 of the invention in the telephoto end.

FIG. 1 to FIG. 5 are longitudinal section views of numerical examples 1 to 5 of zoom lenses of the invention, respectively. In these figures, reference character L1 denotes a first lens unit of positive refractive power and reference character L2 denotes a second lens unit of negative refractive power. Both the first and second lens units are made to axially move toward the object side, while decreasing the separation therebetween as shown by arrows, so that zooming is performed from the wide-angle end to the telephoto end.

The first lens unit L1 has a front lens sub-unit 1a and a rear lens sub-unit 1b, totaling two lens sub-units. Of these, the front lens sub-unit 1a comprises a positive first lens of meniscus form convex toward the object side and a negative second lens of bi-concave form. The rear lens sub-unit 1b comprises a negative third lens of meniscus form convex toward the object side and a positive fourth lens of bi-convex form.

A stop SP is located in between the front lens sub-unit 1a and the rear lens sub-unit 1b and, during zooming, moves in unison with the first lens unit L1. Reference character IP denotes an image plane.

In the present embodiment of the invention, the above-described zooming method, form and construction of the constituent lenses are employed in combination with the conditions described before. By this, the total length of the entire lens system is shortened. Particularly, for the wide-angle end, the field angle is widened with the shortening of the total length. In addition, for the variable magnification ratio of about 2, the variation of aberrations with zooming is corrected well for good stability of a high optical performance throughout the entire variable magnification range.

Next, the features of the design of the 2-unit zoom lens which are characteristic of the invention are described below.

In the 2-unit zoom lens according to the invention, the zooming provision is made in the first lens unit, and the imaging performance of the first lens unit is compensated for by the second lens unit. For the first lens unit, it is, therefore, desired to use a lens configuration that is amenable to good correction of aberrations by itself. Considering the first lens unit as a mono-focal length lens, the basic structure is taken from a triplet lens which assures the possibility of correcting aberrations well. So, the triplet lens is made constructed as comprising positive, negative and positive lenses. Then, the negative second lens in the triplet lens is divided into two parts, i.e., negative and negative lenses. In all, the positive, negative, negative and positive lenses constitute the first lens unit. It is thus made possible to correct aberrations well.

In particular, the positive first lens is formed to a meniscus shape convex toward the object side, the negative second lens is formed to a bi-concave form, the negative third lens is formed to a meniscus shape convex toward the object side, and the positive fourth lens is formed to a bi-convex form. By this, the aberrations, mainly, spherical, comatic and chromatic ones, are corrected well. Moreover, the manufacturing tolerance with which the lens elements are assembled can be loosened.

The 2-unit zoom lens has another feature that the second lens unit is caused to take its place near the image plane. Therefore, the outer diameter of the second lens unit tends to become larger. For this reason, as the number of lenses in the second lens unit increases, the size of the entire lens system would come to increase rapidly.

On this account, in the present embodiment, the second lens unit is constructed with two lenses of certain forms. In particular, the positive fifth lens is formed to a meniscus shape convex toward the image side, and the negative sixth lens is formed to a meniscus shape convex toward the image side. By this, the off-axial aberrations, mainly, the pincushion type distortion, in the wide-angle end are corrected well.

In the present embodiment, the compact form of zoom lens is considered to be fundamental. In this respect, the zoom lens comprises, in order from an object side to an image side, a first lens unit of positive refractive power and a second lens unit of negative refractive power, the separation therebetween being varied to effect zooming, wherein the first lens unit has a positive first lens, a negative second lens, a negative third lens and a positive fourth lens, totaling four lenses, and the second lens unit has a positive fifth lens and a negative sixth lens, totaling two lenses.

With such an arrangement and construction as the basic lens design, specific examples of the zoom lens are shown by setting forth conditions (1a) and (2a), or (1b) and (2b), described below.

$$0.5 < f1/fw < 0.9 \quad (1a)$$

$$0.01 < D6/fw < 0.1 \quad (2a)$$

where f1 is a focal length of the first lens unit L1, fw is a focal length in the wide-angle end of the zoom lens, and D6 is an axial air separation between the third lens and the fourth lens.

$$0.5 < f1/fw < 0.9 \quad (1b)$$

$$0.5 < R6/R7 < 0.9 \quad (2b)$$

where f1 is a focal length of the first lens unit L1, fw is a focal length in the wide-angle end of the zoom lens, R6 is a radius of curvature of a surface on the image side of the third lens, and R7 is a radius of curvature of a surface on the object side of the fourth lens.

Next, the technical significance of each of the above-described conditions is described below.

The inequalities of conditions (1a) and (1b) are concerned with the refractive power of the first lens unit and have an aim chiefly to minimize the size of the entire lens system. When the upper limit of the condition (1a) or (1b) is exceeded, as this implies that the refractive power of the first lens unit is too weak (the focal length is too long), the required total zooming movement of the first lens unit becomes longer, resulting in the lens system increasing in size largely. When the lower limit is exceeded, as this implies that the refractive power of the first lens unit is too strong, the entire lens system becomes small in size, but an increasing amount of produced aberrations results and the image defect for the position error of the first lens unit becomes greater. To correct this, the lens members must be held with a more severe tolerance. Therefore, the complexity of structure of the lens mounting mechanism increases objectionably.

To further improve the compact form of the entire lens system with the maintenance of a good optical performance, it is preferable in the invention that the numerical value of the factor in the condition (1a) or (1b) falls in the following range:

$$0.5 < f1/fw < 0.8 \quad (1c)$$

The inequalities of condition (2a) are concerned with the ratio of the axial air separation between the negative third lens and the positive fourth lens in the rear lens sub-unit 1b to the focal length in the wide-angle end of the entire lens system and give a range for the thickness of the air lens which has an aim chiefly to correct the various aberrations, particularly, spherical aberration, in good balance throughout the entire zooming range with the limitation of the size of the first lens unit to a minimum.

When the separation D6 increases beyond the upper limit of the condition (2a), the size of the first lens unit increases objectionably. Conversely, when the separation D6 decreases from the lower limit, the spherical aberration tends to be over-corrected, particularly, in the telephoto end. This should be avoided.

For more desired results, it is preferable in the invention that the upper limit of the condition (2a) is altered to 0.07. According to this, the compact form of the first lens unit is further improved.

The inequalities of condition (2b) are concerned with the ratio of the radius of curvature of the surface on the image side of the negative third lens to the radius of curvature of the surface on the object side of the positive fourth lens in the rear lens sub-unit 1b and have an aim chiefly to correct the spherical aberration in good balance throughout the entire zooming range.

When the upper limit of the condition (2b) is exceeded, the spherical aberration tends to be under-corrected. So, it is not desirable. Conversely, when the lower limit is exceeded, over-correction of the spherical aberration results. Moreover, its variation with zooming tends to increase. So, it is also not desirable.

In the invention, it is more preferred to alter the lower limit of the condition (2b) to 0.6. According to this, the variation of the spherical aberration with zooming can be more suppressed.

The rules of design described above are found to be sufficient for accomplishing the object of the invention. In the present embodiment, to achieve further improvements of the optical performance, it is preferable to satisfy at least one of the following conditions (i) to (v).

(i) Letting a radius of curvature of the i-th lens surface, when counted from the object side, be denoted by $Ri$, and the Abbe number of a material of the second lens be denoted by $v2$, the following conditions are satisfied:

$$0.3 < R1/R2 < 0.95 \quad (3)$$

$$46 < v2 \quad (4)$$

The inequalities of condition (3) have an aim chiefly to correct astigmatism in good balance. When the upper limit of the condition (3) is exceeded, as this implies that the refractive power of the positive first lens is too small, the astigmatism becomes insufficient to correct, particularly, in the wide-angle end. So, it is not desirable. Conversely, when the refractive power of the positive first lens is too large beyond the lower limit, the spherical aberration, in particular, tends to be under-corrected. So, it is also not desirable.

In the invention, it is more preferred to alter the lower limit of the condition (3) to 0.6. According to this, the correction of all aberrations can be more facilitated.

The inequality of condition (4) has an aim chiefly to correct longitudinal and lateral chromatic aberrations. When the lower limit of the condition (4) is exceeded, the variation of the longitudinal and lateral chromatic aberrations with zooming increases. So it is not desirable.

In the invention, it is more preferred to alter the lower limit of the condition (4) to 50. According to this, all aberrations can be better corrected.

(ii) Letting an axial air separation between the fifth lens and the sixth lens be denoted by D10, wherein R11 is a radius of curvature of a surface on the object side of said sixth lens the following conditions are satisfied:

$$0.1 < D10/fw < 0.3 \quad (5)$$

$$0.5 < R11/fw < -0.2 \quad (6)$$

The inequalities of conditions (5) and (6) are concerned with the lens form of the second lens unit for an aim chiefly to improve the compact form of the entire lens system in such a manner as to maintain a high optical performance.

Of these, the inequalities of condition (5) have an aim chiefly to make a compromise between the improvement of the compact form of the entire lens system and the good correction of coma in the wide-angle end. When the upper limit of the condition (5) is exceeded, the total length of the complete lens increases objectionably. When the lower limit is exceeded, the difficulty of correcting the coma in the wide-angle end increases objectionably.

In the invention, it is more preferred to alter the upper limit of the condition (5) to 0.2. According to this, the minimization of the total length of the complete lens is more facilitated.

The inequalities of condition (6) have an aim chiefly to give an appropriate shape to the negative fifth lens to correct the coma well in the wide-angle end, so that the improvements of the compact form of the entire lens system are achieved. When the upper or lower limit of the condition (6) is exceeded, the second lens unit, in particular, increases in size. Also, the difficulty of correcting the coma in the wide-angle end increases objectionably.

(iii) It is preferable to employ at least one aspheric surface in the first lens unit. If so, the requirements of maintaining a high optical performance and of minimizing the size of the first lens unit are fulfilled at once. This is particularly advantageous at correcting spherical aberration.

(iv) It is preferable to employ at least one aspheric surface in the second lens unit. In this case, the requirements of maintaining a high optical performance and of minimizing the size of the second lens unit are fulfilled at once. This is particularly advantageous at correcting the coma in the wide-angle end.

(v) It is preferable to locate the stop SP in between the front lens sub-unit 1a and the rear lens sub-unit 1b so as to shorten the total length in the telephoto end of the entire lens system.

Next, the numerical examples 1 to 5 of the invention are shown. In the numerical data for the examples 1 to 5, Ri is the radius of curvature of the i-th lens surface, when counted from the object side, Di is the axial i-th lens thickness or air separation, when counted from the object side, and Ni and vi are respectively the refractive index and Abbe number of the glass of the i-th lens element, when counted from the object side. The shape of the aspheric surface is expressed in the coordinates with an X axis in the axial direction and a Y axis in the direction perpendicular to an optical axis, the direction in which light advances being taken as positive, by the following equation:

$$X = \frac{(1/R)Y^2}{1 + \sqrt{1 - (Y/R)^2}} + BY^4 + CY^6 + DY^8 + EY^{10}$$

where R is the radius of the osculating sphere, and B, C, D and E are the aspheric coefficients.

Notation: "e-0X" means "$\times 10^{-X}$".

The values of the factors in the above-described conditions for the numerical examples are listed in Table-1.

Numerical Example 1:

f = 28.12–56.29   Fno = 4.00–8.01   2ω = 75.1°–42.0°

| | | | |
|---|---|---|---|
| R1 = 13.91 | D1 = 1.63 | N1 = 1.517417 | v1 = 52.4 |
| R2 = 16.60 | D2 = 0.76 | | |
| R3 = −148.98 | D3 = 1.38 | N2 = 1.677900 | v2 = 55.3 |
| R4 = 103.50 | D4 = 3.04 | | |
| R5 = 50.90 | D5 = 1.25 | N3 = 1.846660 | v3 = 23.8 |
| R6 = 21.14 | D6 = 1.19 | | |
| R7 = 26.78 | D7 = 3.39 | N4 = 1.583126 | v4 = 59.4 |
| R8 = −11.21 | D8 = Variable | | |
| R9 = −30.61 | D9 = 2.63 | N5 = 1.672700 | v5 = 32.1 |
| R10 = −18.88 | D10 = 4.13 | | |
| R11 = −10.31 | D11 = 1.38 | N6 = 1.743198 | v6 = 49.3 |
| R12 = −83.96 | | | |

| Focal Length | | 28.12 | 41.25 | 56.29 |
|---|---|---|---|---|
| Variable Separation | D8 | 9.39 | 4.24 | 1.30 |

Aspheric Coefficients

| R4: | A = 0 | B = 1.749 e-04 | C = 2.909 e-06 |
|---|---|---|---|
| | D = −1.368 e-08 | E = 0 | |
| R10: | A = 0 | B = −5.095 e-05 | C = 2.568 e-07 |
| | D = −9.240 e-09 | E = 2.506 e-11 | |

Numerical Example 2:

f = 30.63–59.00   Fno = 4.00–7.71   2ω = 70.5°–40.3°

| | | | |
|---|---|---|---|
| R1 = 13.50 | D1 = 1.87 | N1 = 1.487490 | v1 = 70.2 |
| R2 = 22.81 | D2 = 0.57 | | |
| R3 = −109.42 | D3 = 1.50 | N2 = 1.638539 | v2 = 55.4 |
| R4 = 68.62 | D4 = 2.83 | | |
| R5 = 75.32 | D5 = 1.37 | N3 = 1.805181 | v3 = 25.4 |
| R6 = 21.70 | D6 = 1.50 | | |
| R7 = 27.26 | D7 = 3.07 | N4 = 1.622799 | v4 = 57.1 |
| R8 = −12.78 | D8 = Variable | | |
| R9 = −29.86 | D9 = 2.62 | N5 = 1.647689 | v5 = 33.8 |
| R10 = −19.36 | D10 = 4.43 | | |
| R11 = −10.23 | D11 = 1.50 | N6 = 1.719995 | v6 = 50.3 |
| R12 = −78.02 | | | |

| Focal Length | | 30.63 | 43.62 | 59.00 |
|---|---|---|---|---|
| Variable Separation | D8 | 8.50 | 3.93 | 1.11 |

Aspheric Coefficients

| R4: | A = 0 | B = 1.423 e-04 | C = 2.211 e-06 |
|---|---|---|---|
| | D = −1.207 e-08 | E = 0 | |
| R10: | A = 0 | B = −4.668 e-05 | C = 5.764 e-08 |
| | D = −8.369 e-09 | E = 3.325 e-11 | |

Numerical Example 3:

f = 32.50–65.00   Fno = 4.00–8.00   2ω = 67.3°–36.8°

| | | | |
|---|---|---|---|
| R1 = 13.45 | D1 = 1.50 | N1 = 1.548141 | v1 = 45.8 |
| R2 = 15.81 | D2 = 0.67 | | |
| R3 = −236.05 | D3 = 1.06 | N2 = 1.658296 | v2 = 57.3 |
| R4 = 95.24 | D4 = 3.48 | | |
| R5 = 75.34 | D5 = 1.12 | N3 = 1.846659 | v3 = 23.8 |
| R6 = 21.50 | D6 = 0.94 | | |
| R7 = 24.95 | D7 = 4.42 | N4 = 1.622799 | v4 = 57.1 |
| R8 = −12.65 | D8 = Variable | | |
| R9 = −33.58 | D9 = 2.50 | N5 = 1.688930 | v5 = 31.1 |
| R10 = −21.90 | D10 = 4.87 | | |
| R11 = −10.29 | D11 = 1.44 | N6 = 1.693501 | v6 = 53.2 |
| R12 = −91.75 | | | |

| Focal Length | | 32.50 | 47.22 | 65.00 |
|---|---|---|---|---|
| Variable Separation | D8 | 8.61 | 3.94 | 1.11 |

Aspheric Coefficients

| R4: | A = 0 | B = 1.525 e-04 | C = 7.046 e-07 |
|---|---|---|---|
| | D = 2.937 e-08 | E = 0 | |
| R10: | A = 0 | B = −4.656 e-05 | C = −1.927 e-08 |
| | D = −4.801 e-09 | E = 8.458 e-12 | |

Numerical Example 4:

f = 38.07–74.99   Fno = 4.50–8.86   2ω = 59.2°–32.2°

| | | | |
|---|---|---|---|
| R1 = 14.25 | D1 = 1.37 | N1 = 1.516016 | v1 = 56.8 |
| R2 = 18.84 | D2 = 0.87 | | |

-continued

| | | | |
|---|---|---|---|
| R3 = −73.92 | D3 = 1.00 | N2 = 1.696797 | v2 = 55.5 |
| R4 = 330.30 | D4 = 4.13 | | |
| R5 = 58.61 | D5 = 1.00 | N3 = 1.805181 | v3 = 25.4 |
| R6 = 16.68 | D6 = 0.96 | | |
| R7 = 19.16 | D7 = 3.08 | N4 = 1.570989 | v4 = 50.8 |
| R8 = −12.43 | D8 = Variable | | |
| R9 = −37.22 | D9 = 2.37 | N5 = 1.583060 | v5 = 30.2 |
| R10 = −23.96 | D10 = 4.89 | | |
| R11 = −10.27 | D11 = 1.31 | N6 = 1.729157 | v6 = 54.7 |
| R12 = −49.74 | | | |

| | | | |
|---|---|---|---|
| Focal Length | | 38.07 54.45 | 74.99 |
| Variable Separation | D8 | 9.72 5.46 | 2.75 |

Aspheric Coefficients

| | | | |
|---|---|---|---|
| R4: | A = 0 | B = 1.256 e-04 | C = 5.853 e-07 |
| | D = 1.364 e-08 | E = 0 | |
| R9: | A = 0 | B = 5.883 e-05 | C = 4.940 e-07 |
| | D = −4.704 e-09 | E = 4.225 e-11 | |

Numerical Example 6:

f= 31.99–74.00   Fno = 4.00–9.25   2ω = 68.1°–32.6°

| | | | |
|---|---|---|---|
| R1 = 14.52 | D1 = 1.50 | N1 = 1.531717 | v1 = 48.9 |
| R2 = 17.29 | D2 = 0.81 | | |
| R3 = −103.08 | D3 = 1.06 | N2 = 1.658296 | v2 = 57.3 |
| R4 = 187.54 | D4 = 4.24 | | |
| R5 = 63.04 | D5 = 1.12 | N3 = 1.846659 | v3 = 23.8 |
| R6 = 21.09 | D6 = 0.99 | | |
| R7 = 25.14 | D7 = 2.97 | N4 = 1.571351 | v4 = 53.0 |
| R8 = −12.23 | D8 = Variable | | |
| R9 = −34.61 | D9 = 2.87 | N5 = 1.672700 | v5 = 32.1 |
| R10 = −24.63 | D10 = 5.42 | | |
| R11 = −11.41 | D11 = 1.50 | N6 = 1.712995 | v6 = 53.8 |
| R12 = −78.31 | | | |

| | | | |
|---|---|---|---|
| Focal Length | | 31.99 51.63 | 74.00 |
| Variable Separation | D8 | 11.69 5.03 | 1.75 |

Aspheric Coefficients

| | | | |
|---|---|---|---|
| R4: | A = 0 | B = 1.323 e-04 | C = 7.779 e-07 |
| | D = 2.058 e-08 | E = 0 | |
| R9: | A = 0 | B = −1.096 e-06 | C = 5.505 e-07 |
| | D = −1.631 e-09 | E = −1.494 e-11 | |
| R10: | A = 0 | B = −3.377 e-05 | C = 1.094 e-07 |
| | D = 1.079 e-09 | E = −2.895 e-11 | |

TABLE 1

| | | Numerical Example | | | | |
|---|---|---|---|---|---|---|
| Condition | | 1 | 2 | 3 | 4 | 5 |
| (1a) | f1/fw | 0.75 | 0.71 | 0.69 | 0.64 | 0.76 |
| (1b) | | | | | | |
| (2a) | D6/fw | 0.042 | 0.049 | 0.029 | 0.025 | 0.031 |
| (2b) | R6/R7 | 0.79 | 0.80 | 0.86 | 0.87 | 0.84 |
| (3) | R1/R2 | 0.84 | 0.59 | 0.85 | 0.76 | 0.84 |
| (4) | v2 | 55.3 | 55.4 | 57.3 | 55.5 | 57.3 |
| (5) | D10/fw | 0.15 | 0.15 | 0.15 | 0.13 | 0.17 |
| (6) | R11/fw | −0.37 | −0.33 | −0.32 | −0.27 | −0.36 |

What is claimed is:

1. A zoom lens comprising, in order from an object side to an image side:

a first lens unit having a positive refractive power, said first lens unit including, in order from the object side to the image side, a first lens of meniscus shape convex toward the object side having a positive refractive power, a second lens having a negative refractive power, a third lens having a negative refractive power and a fourth lens having a positive refractive power; and a second lens unit having a negative refractive power, said second lens unit including, in order from the object side to the image side, a fifth lens having a positive refractive power and a sixth lens having a negative refractive power, wherein zooming is effected by varying a separation between said first lens unit and said second lens unit, wherein, letting a focal length of said first lens unit be denoted by f1, a focal length in a wide-angle end of said zoom lens be denoted by fw, and an axial air separation between said third lens and said fourth lens be denoted by D6, the following conditions are satisfied:

$$0.5 < f1/fw < 0.9$$

$$0.01 < D6/fw < 0.1,$$

and wherein, in said first lens unit, no lenses other than said second lens and said third lens are present between said first lens and said fourth lens.

2. A zoom lens according to claim 1, further satisfying the following conditions:

$$0.3 < R1/R2 < 0.95$$

$$46 < v2$$

where R1 is a radius of curvature of a surface on the object side of said first lens, R2 is a radius of curvature of a surface on the image side of said first lens, and v2 is the Abbe number of a material of said second lens.

3. A zoom lens according to claim 2, further satisfying the following conditions:

$$0.1 < D10/fw < 0.3$$

$$-0.5 < R11/fw < -0.2$$

where D10 is an axial air separation between said fifth lens and said sixth lens, and R11 is a radius of curvature of a surface on the object side of said sixth lens.

4. A zoom lens according to claim 3, wherein a stop is located between said second lens and said third lens.

5. A zoom lens according to claim 3, wherein said first lens unit has at least one aspheric surface.

6. A zoom lens according to claim 3, wherein said second lens unit has at least one aspheric surface.

7. A zoom lens comprising, in order from an object side to an image side:

a first lens unit having a positive refractive power, said first lens unit including, in order from the object side to the image side, a first lens of meniscus form convex toward the object side having a positive refractive power, a second lens having a negative refractive power, a third lens of meniscus form convex toward the object side having a negative refractive power and a fourth lens having convex surfaces both on the object side and the image side and having a positive refractive power; and a second lens unit having a negative refractive power, said second lens unit including, in order from the object side to the image side, a fifth lens having a positive refractive power and a sixth lens having a negative refractive power, wherein zooming is effected by varying a separation between said first lens unit and said second lens unit, wherein, letting a focal length of said first lens unit be denoted by f1, a focal length in a wide-angle end of said zoom lens be denoted by fw, a radius of curvature of a surface on the image side of said third lens be denoted by R6, and a radius of curvature of a surface on the object side of said fourth lens be denoted by R7, the following conditions are satisfied:

$$0.5 < f1/fw < 0.9$$

$$0.5 < R6/R7 < 0.9,$$

and wherein, in said first lens unit, no lenses other than said second lens and said third lens are present between said first lens and said fourth lens.

8. A zoom lens according to claim 7, further satisfying the following conditions:

$$0.3 < R1/R2 < 0.95$$

$$46 < v2$$

where R1 is a radius of curvature of a surface on the object side of said first lens, R2 is a radius of curvature of a surface on the image side of said first lens, and v2 is the Abbe number of a material of said second lens.

9. A zoom lens according to claim 8, further satisfying the following conditions:

$$0.1 < D10/fw < 0.3$$

$$-0.5 < R11/fw < -0.2$$

where D10 is an axial air separation between said fifth lens and said sixth lens, and R11 is a radius of curvature of a surface on the object side of said sixth lens.

10. A zoom lens according to claim 9, wherein a stop is located between said second lens and said third lens.

11. A zoom lens according to claim 9, wherein said first lens unit has at least one aspheric surface.

12. A zoom lens according to claim 9, wherein said second lens unit has at least one aspheric surface.

* * * * *

UNITED STATES PATENT AND TRADEMARK OFFICE
CERTIFICATE OF CORRECTION

PATENT NO. : 5,757,556

DATED : May 26, 1998

INVENTOR(S) : TAKESHI NISHIMURA

It is certified that error appears in the above-identified patent and that said Letters Patent is hereby corrected as shown below:

COLUMN 7:

Line 48, "$^{x}10^{-x}$" should read --$x10^{-x}$--; and

COLUMN 10:

Line 28, "$\nu$" should read --<--.

Signed and Sealed this

Twenty-seventh Day of April, 1999

Attest:

Q. TODD DICKINSON

*Attesting Officer*  *Acting Commissioner of Patents and Trademarks*